(12) United States Patent
Derneryd et al.

(10) Patent No.: US 9,635,564 B2
(45) Date of Patent: Apr. 25, 2017

(54) COMMUNICATION SYSTEM NODE WITH IMPROVED INTERFERENCE SITUATION

(75) Inventors: Anders Derneryd, Gothenburg (SE); Martin Johansson, Molndal (SE); Arne Simonsson, Gammelstad (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 13/643,906

(22) PCT Filed: Apr. 26, 2010

(86) PCT No.: PCT/EP2010/055526
§ 371 (c)(1),
(2), (4) Date: Oct. 26, 2012

(87) PCT Pub. No.: WO2011/134488
PCT Pub. Date: Nov. 3, 2011

(65) Prior Publication Data
US 2013/0040651 A1  Feb. 14, 2013

(51) Int. Cl.
*H04W 72/00* (2009.01)
*H04W 16/28* (2009.01)

(52) U.S. Cl.
CPC .................. *H04W 16/28* (2013.01)

(58) Field of Classification Search
CPC ..... H04W 16/00; H04W 16/24; H04W 16/28; H04W 16/30; H04W 40/06
See application file for complete search history.

(56) References Cited

U.S. PATENT DOCUMENTS

| | | | |
|---|---|---|---|
| 5,491,833 A * | 2/1996 | Hamabe | 455/422.1 |
| 5,805,996 A * | 9/1998 | Salmela | 455/453 |
| 6,421,005 B1 * | 7/2002 | Weaver | H01Q 1/246 |
| | | | 342/367 |
| 6,421,542 B1 | 7/2002 | Sandler et al. | |

(Continued)

FOREIGN PATENT DOCUMENTS

| CN | 1882183 A | 12/2006 |
|---|---|---|
| CN | 101547448 A | 9/2009 |

OTHER PUBLICATIONS

Office Action dated Apr. 22, 2014, issued in Mexican Patent Application No. MX/a/2012/010828, 3 pages.

(Continued)

*Primary Examiner* — Shantell L Heiber
(74) *Attorney, Agent, or Firm* — Rothwell, Figg, Ernst & Manbeck, P.C.

(57) ABSTRACT

A node in a wireless communication system comprising at least a first cell region and a second cell region, where cell borders delimit between different cell regions. The node comprises at least a first antenna function with a first antenna radiation lobe and a second antenna function with a second antenna radiation lobe, the radiation lobes being arranged to cover the first cell region at the same time. For each cell region, only one of the antenna radiation lobes is intended for communication at each cell border. Furthermore, the first antenna radiation lobe is arranged for signals at a first frequency band, and the second antenna radiation lobe is arranged for signals at least a second frequency band.

20 Claims, 5 Drawing Sheets

(56) References Cited

U.S. PATENT DOCUMENTS

| | | | |
|---|---|---|---|
| 6,606,500 B1* | 8/2003 | Kronestedt | H04B 1/715 375/132 |
| 2004/0229651 A1* | 11/2004 | Hulkkonen | H01Q 1/246 455/562.1 |
| 2005/0202784 A1* | 9/2005 | Xu et al. | 455/63.3 |
| 2006/0084474 A1* | 4/2006 | Iacono et al. | 455/562.1 |
| 2006/0276229 A1 | 12/2006 | Braun et al. | |
| 2007/0202809 A1* | 8/2007 | Lastinger et al. | 455/63.4 |
| 2009/0285195 A1 | 11/2009 | Chen | |
| 2010/0075687 A1* | 3/2010 | Chayat | 455/450 |

OTHER PUBLICATIONS

Office Action dated Dec. 2, 2014, issued in Chinese Patent Application No. 201080066454.9, 13 pages.
European Communication dated Feb. 5, 2015, issued in European Patent Application No. 10720368.9, 5 pages.
Office Action issued by the State Intellectual Property Office of China in corresponding application No. 201080066454.9 on May 6, 2015, 9 pages.
Third Office Action dated Oct. 12, 2015, issued in Chinese Patent Application No. 201080066454.9, 5 pages.

* cited by examiner

COMMUNICATION SYSTEM NODE WITH IMPROVED INTERFERENCE SITUATION

CROSS REFERENCE TO RELATED APPLICATION(S)

This application is a 35 U.S.C. §371 National Phase Entry Application from PCT/EP2010/055526, filed Apr. 26, 2010, designating the United States, the disclosure of which is incorporated herein in its entirety by reference.

TECHNICAL FIELD

The present invention relates to a node in a wireless communication system comprising at least a first cell region and a second cell region, where cell borders delimit between different cell regions. The node comprises at least a first antenna function with a first antenna radiation lobe and a second antenna function with a second antenna radiation lobe. The first antenna radiation lobe and the second antenna radiation lobe are arranged to cover the first cell region at the same time, where, for each cell region, only one of the antenna radiation lobes is intended for communication at each cell border.

The present invention also relates to a method for obtaining an improved interference situation at least along a cell border for a cell region in a wireless communication system. The method comprises the step of radiating a first antenna radiation lobe and a second antenna radiation lobe, which antenna radiation lobes are used to cover said cell region at the same time, where the cell regions are delimited by cell borders and where only one of the antenna radiation lobes is intended for communication in each cell border region.

BACKGROUND

Interference in cellular networks is becoming a limiting factor with the rapid increase of the number of users of mobile communications, as well as of the data-rates required by more demanding applications such as mobile internet and streaming services. This has generated a demand for new and efficient ways of improving the interference situation.

Interference from adjacent sectors belonging to the same base station site, i.e., intra-site interference, and from cells belonging to other sites, i.e., inter-site interference, may in many cases reduce the bit-rate in a cellular network. This is particularly valid at sector borders and cell borders when the same frequency bands are used across the whole network (frequency reuse one).

Existing solutions for interference mitigation include higher order sectorization, antenna radiation lobe tilt, underlay/overlay, fractional reuse, and cooperative multicast transmission, i.e., various means of either static or dynamic interference coordination.

Higher-order sectorization implies more cells and an increased number of neighboring cells. This gives rise to more handovers, narrower handover regions with corresponding requirements on rapid cell reallocation, and increased control signaling, and also a general increase in the overall interference level due to the radiation, via the side lobes, from the additional antennas. Higher-order sectorization may therefore lead to performance degradation, lower bit-rates, along sector borders due to a poorer interference situation.

Antenna radiation lobe tilt is useful for inter-site interference management, but does not improve the interference situation along cell borders, neither at borders between cells belonging to the same site, i.e., sectors in a traditional sectorized system, nor on borders between cells belonging to different sites.

Underlay/overlay cells can enable a tight frequency reuse close to the site than at the cell border towards other sites. However, since the power is reduced equally for all underlay cells it does not improve the interference situation at sector borders.

Fractional reuse and coordinated scheduling on site of users in adjacent sectors can be used to improve the interference situation. However, the frequency used by a user terminal near the sector border is then blocked in the whole neighboring sector, thus reducing spectral efficiency.

Cooperative multicast transmission can improve the quality at a sector border significantly, but at the cost of frequencies being explicitly allocated in two sectors, thus reducing spectral efficiency.

There is thus a need to reduce interference from adjacent sectors without the drawbacks of the previously known methods according to the above.

SUMMARY

The object of the present invention is to reduce interference from adjacent sectors without the drawbacks of the previously known methods.

This object is obtained by means of a node in a wireless communication system comprising at least a first cell region and a second cell region, where cell borders delimit between different cell regions. The node comprises at least a first antenna function with a first antenna radiation lobe and a second antenna function with a second antenna radiation lobe. The first antenna radiation lobe and the second antenna radiation lobe are arranged to cover the first cell region at the same time, where, for each cell region, only one of the antenna radiation lobes is intended for communication at each cell border. The first antenna radiation lobe is arranged for signals at a first frequency band, and the second antenna radiation lobe is arranged for signals at at least a second frequency band, where, for each cell region, only one antenna radiation lobe is intended for communication at each cell border. In this way, an improved interference situation at least along each cell border is obtained.

This object is also obtained by means of a method for obtaining an improved interference situation at least along a cell border for a cell region in a wireless communication system. The method comprises the steps of:
radiating a first antenna radiation lobe and a second antenna radiation lobe, which antenna radiation lobes are used to cover said cell region at the same time, where the cell regions are delimited by cell borders and where only one of the antenna radiation lobes is intended for communication in each cell border region
using the first antenna radiation lobe for signals at a first frequency band, and
using the second antenna radiation lobe for signals at at least a second frequency band, where, for each cell region, only one antenna radiation lobe is intended for communication at each cell border such that an improved interference situation at least along each cell border region is obtained.

According to an example, for each cell region of the node, each antenna radiation lobe has a certain pointing direction in a plane, where either all pointing directions are mutually different or the same, where in the latter case only one antenna radiation lobe is intended for communication at least along the corresponding cell borders.

According to another example, the antenna radiation lobes overlap in an azimuth plane or in an elevation plane, where the azimuth plane extends around the node, covering each of the node's cell regions and the elevation plane is perpendicular to the azimuth plane.

According to another example, at least one of the direction, width and shape of the antenna radiation lobes is dynamically changeable.

Other examples are evident from the dependent claims.

A number of advantages are obtained by means of the present invention. Mainly an improved interference situation at least along each cell border is obtained.

Other examples of advantages are that:
Antenna radiation lobe-based fractional reuse with no impact on the mobile terminal requirements is provided.
The interference variation with frequency is increased, enabling increased gain from frequency selective scheduling.
There is no need for new physical cell site deployment.
The user terminals on the market today do not have to be replaced, but can still be used with the present invention.

BRIEF DESCRIPTION OF THE DRAWINGS

The present invention will now be described more in detail with reference to the appended drawings, where.

DETAILED DESCRIPTION

In LTE (Long Term Evolution) and similar standards based on OFDM (Orthogonal Frequency-Division Multiplexing), the primary advantage over single-carrier, for efficient use of the frequency spectrum resource, is that the frequency band/sub-band with the most favorable link budget is adaptively chosen for communication between a radio base station and a mobile terminal, so called frequency-selective scheduling. The purpose is always to select the most favorable frequency spectrum for communication. The monitored parameter can be received power or some other signal quality indicator for the different pilot/reference signals or broadcast channels. In LTE downlink, this is supported in standard by frequency selective CQI (Channel Quality Indicator) reporting. Frequency-selective scheduling provides an opportunity for improving the cell border/edge interference situation by using partial frequency allocation to non-overlapping antenna radiation lobes as will be outlined below.

Another parameter can be the user position in the cell relative the base station. The frequency band is selected for optimal system performance per user terminal independently, based on one or a combination of monitored parameters. This can then support frequency selective scheduling without any need for quality measure and saves uplink resources by reducing quality feedback, CQI reporting, from the mobile.

Figure 1:
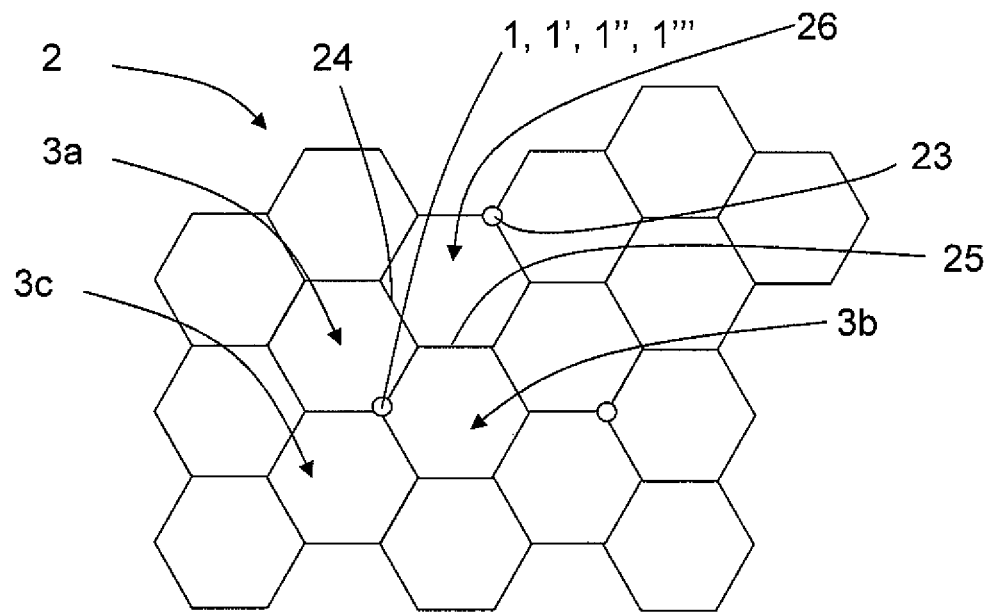
FIG. 1 shows a schematic top view of a wireless communication network.
Figure 2:
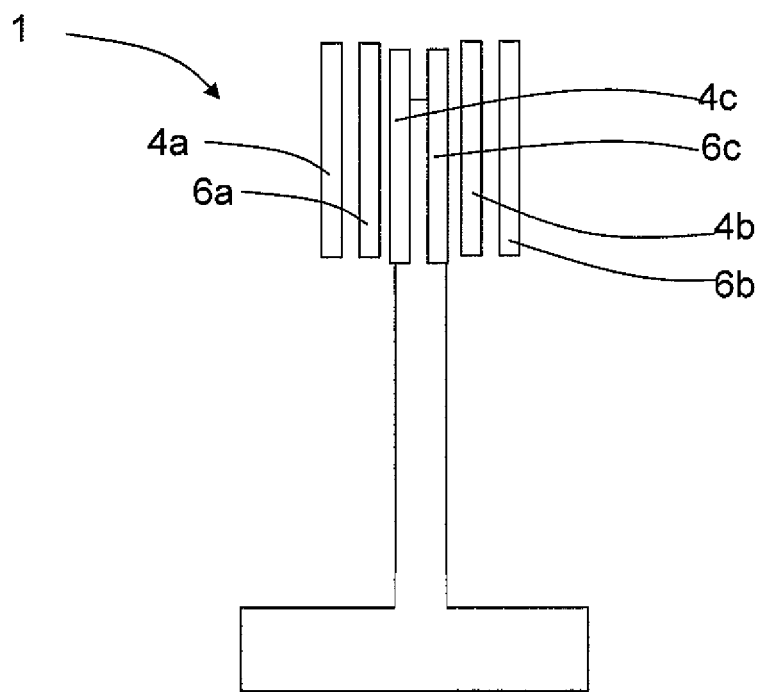
FIG. 2 shows a schematic side view of a node in a wireless communication network.
Figure 3:
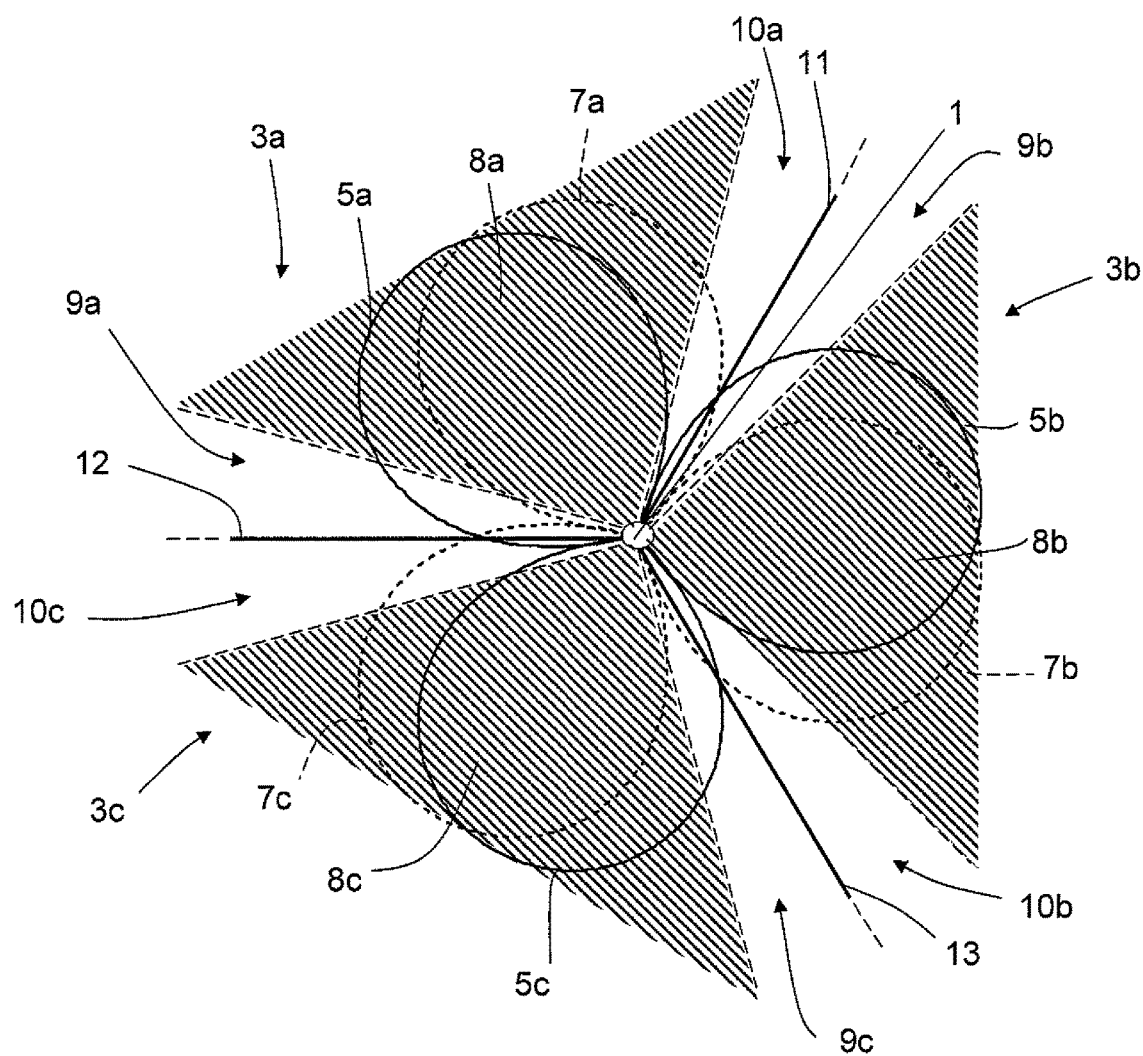
FIG. 3 schematically shows antenna radiation lobe patterns according to a first example of the present invention superimposed on a three-sector site.

In a first embodiment of the present invention with reference to FIG. 1, FIG. 2 and FIG. 3, there is a node 1 in a wireless communication system 2 comprising a first cell region 3a, a second cell region 3b and a third cell region 3c. A first cell border 11 delimits between the first cell region 3a and the second cell region 3b, a second cell border 12 delimits between the first cell region 3a and the third cell region 3c, and a third cell border 13 delimits between the second cell region 3b and the third cell region 3c.

The node 1 comprises a first antenna function 4a with a first antenna radiation lobe 5a and a second antenna function 6a with a second antenna radiation lobe 7a, where the first antenna radiation lobe 5a and the second antenna radiation lobe 7a are arranged to cover the first cell region 3a at the same time. Of these antenna radiation lobes 5a, 7a only one is primarily intended for communication in corresponding cell border regions 9a, 10a in the first cell region 3a. This will be explained more in detail below.

There is a cell center region 8a in the first cell region 3a, shown with sectional lines, where both the first antenna radiation lobe 5a and the second antenna radiation lobe 7a are intended for communication. Between the cell center region 8a and the second cell border 12 there is a first cell border region 9a where the first antenna radiation lobe 5a is intended for communication, but not the second antenna radiation lobe 7a.

In this context, when a certain antenna radiation lobe is mentioned to be intended for communication, but not an other antenna radiation lobe, this is due to that the signal level of said certain antenna radiation lobe, in the case above the first antenna radiation lobe 5a, is higher than said other antenna radiation lobe, in the case above the second antenna radiation lobe 7a, where furthermore the signal level of said certain antenna radiation lobe admits practical communication, but the signal level of said other antenna radiation lobe is too low for practical communication.

In the same way, between the cell center region 8a and the first cell border 11 there is a second cell border region 10a where the second antenna radiation lobe 7a is intended for communication, but not the first antenna radiation lobe 5a. For the first and second antenna radiation lobes 5a, 7a this means that, along and near the first cell border 11, only the second antenna radiation lobe 7a is intended for communication, and in the same way, along and near the second cell border 12, only the first antenna radiation lobe 5a is intended for communication.

The separation of the cell region 3a into the cell center region 8a and the cell border regions 9a, 10a where one of the antenna radiation lobes 5a, 7a is intended for communication but not the other, is due to the fact that the antenna radiation lobes 5a, 7a are separated in azimuth as illustrated in the top view of FIG. 3.

Furthermore, the node 1 comprises a second antenna function 4b with a first antenna radiation lobe 5b and a second antenna function 6b with a second antenna radiation lobe 7b, and a third antenna function 4c with a first antenna radiation lobe 5c and a second antenna function 6c with a second antenna radiation lobe 7c. In the second cell region 3b there are thus corresponding antenna radiation lobes 5b, 7b, and in the third cell region 3c there are corresponding antenna radiation lobes 5c, 7c, where the antenna radiation lobes in these cell regions 3b, 3c are separated in azimuth in the same way as the antenna radiation lobes 5a, 7a in the first cell region 3a, such that corresponding cell center regions 8b, 8c are formed, being shown with sectional lines.

For the second cell region 3b, between the cell center region 8b and the first cell border 11, there is a first cell border region 9b, adjacent the second cell border region 10a of the first cell region 3a. Furthermore, between the cell center region 8b and the third cell border 13 there is a second cell border region 10b, For the third cell region 3c, between the cell center region 8c and the third cell border 13, there is a first cell border region 9c, adjacent the second cell border region 10b of the second cell region 3b. Furthermore, between the cell center region 8c and the second cell border 12 there is a second cell border region 10c, adjacent the first cell border region 9a of the first cell region 3a.

This means that corresponding coverage situations are existent in the second cell region 3b and the third cell region 3c, which will be described briefly below.

In the second cell region 3b, along and near the first cell border 11, within the first cell border region 9b, the first antenna radiation lobe 5b is intended for communication, but not the second antenna radiation lobe 7b. In the second cell region 3b, along and near the third cell border 13, within the second cell border region 10b, the second antenna radiation lobe 7b is intended for communication, but not the first antenna radiation lobe 5b.

In the third cell region 3c, along and near the third cell border 13, within the first cell border region 9c, the first antenna radiation lobe 5c is intended for communication, but not the second antenna radiation lobe 7c. In the third cell region 3c, along and near the second cell border 12, within the second cell border region 10c, the second antenna radiation lobe 7c is intended for communication, but not the first antenna radiation lobe 5c.

When regarding the cell borders 11, 12, 13, this means that along the first cell border 11 only the second antenna radiation lobe 7a of the first cell region 3a and the first antenna radiation lobe 5b of the second cell region 3b are intended for communication. Furthermore, along the second cell border 12 only the first antenna radiation lobe 5a of the first cell region 3a and the second antenna radiation lobe 7c of the third cell region 3c are intended for communication. Finally, along the third cell border 13 only the second antenna radiation lobe 7b of the second cell region 3b and the first antenna radiation lobe 5c of the third cell region 3c are intended for communication.

According to the present invention, for each cell region 3a, 3b, 3c, the first antenna radiation lobe 5a, 5b, 5c is arranged for signals at a first frequency band f1, and the second antenna radiation lobe 7a, 7b, 7c is arranged for signals at a second frequency band f2, where antenna radiation lobes arranged for different frequencies are intended for communication at different sides of a cell border 11, 12, 13, such that an improved interference situation along and near each cell border 11, 12, 13, within the cell border regions 9a, 10a; 9b, 10b; 9c, 10c is obtained.

The separate frequency bands, f1, f2 are thus transmitted in different and partly overlapping antenna radiation lobes within each sector. The cell center region 8a, 8b, 8c of each sector is covered by both antenna radiation lobes, 5a, 7a; 5b, 7b; 5c, 7c for corresponding cell regions 3a, 3b, 3c, allowing access to the whole frequency band f, where the whole frequency band f equals the combined span of the first frequency band f1 and the second frequency band f2.

In the cell border regions 9a, 10a; 9b, 10b; 9c, 10c, transmission is scheduled either within the first frequency band f1 or within the second frequency band f2, depending on which antenna radiation lobe a user terminal is served by. The first frequency band f1 is different from the second frequency band f2, but may have overlapping parts.

The interference is thus reduced compared to a conventional reuse one sector system, since regions with potential interference covered by the same frequency bands are reduced.

Figure 4:
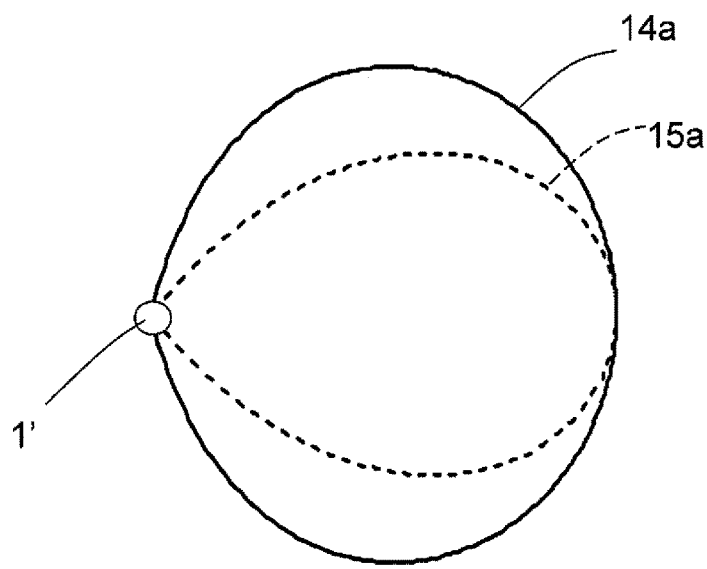
FIG. 4 schematically shows a first view of antenna radiation lobe patterns according to a second example of the present invention.
Figure 5:
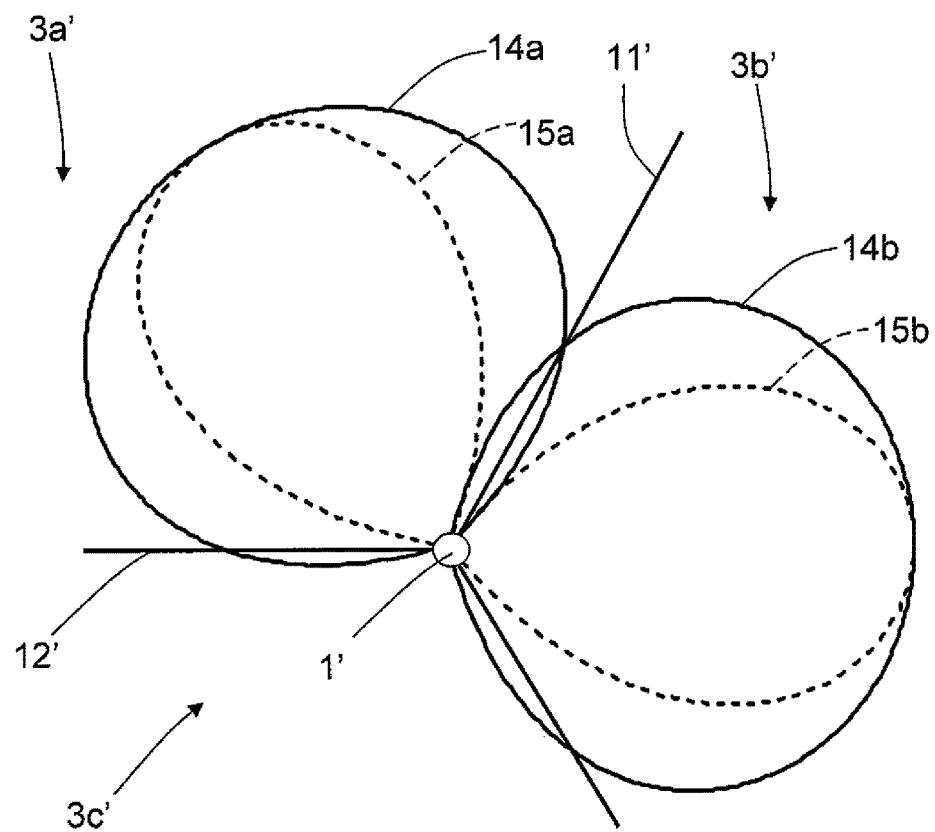
FIG. 5 schematically shows a second view of antenna radiation lobe patterns according to the second example of the present invention.

Another embodiment with multiple antenna radiation lobes in azimuth is shown in FIG. 4 and FIG. 5, where the frequency bands f1, f2 are transmitted in different antenna radiation lobes as illustrated. A first antenna radiation lobe 14a is intended for communication within a first cell region 3a', delimited by a first cell border 11' and a second cell border 12', using the first frequency band f1. A second antenna radiation lobe 15a is intended for communication in a central part of the first cell region 3a' using the second frequency band f2.

Of these antenna radiation lobes 14a, 15a only the first antenna radiation lobe 14a is intended for communication along and near the cell borders 11', 12', the second antenna radiation lobe 15a having a narrower antenna radiation lobe-width. Corresponding antenna radiation lobes 14b, 15b are used in the adjacent cell region 3b'. The same applies for a third cell region 3c', although this is not illustrated here. In the second cell region 3b', the frequency bands are selected in the opposite way. That is, the second frequency band f2 is used for the first antenna radiation lobe 14b, while the first frequency band f1 is used for the second antenna radiation lobe 15b. Thus the first frequency band f1 is only intended for communication in a central part of the second cell region 3b'.

Figure 6:
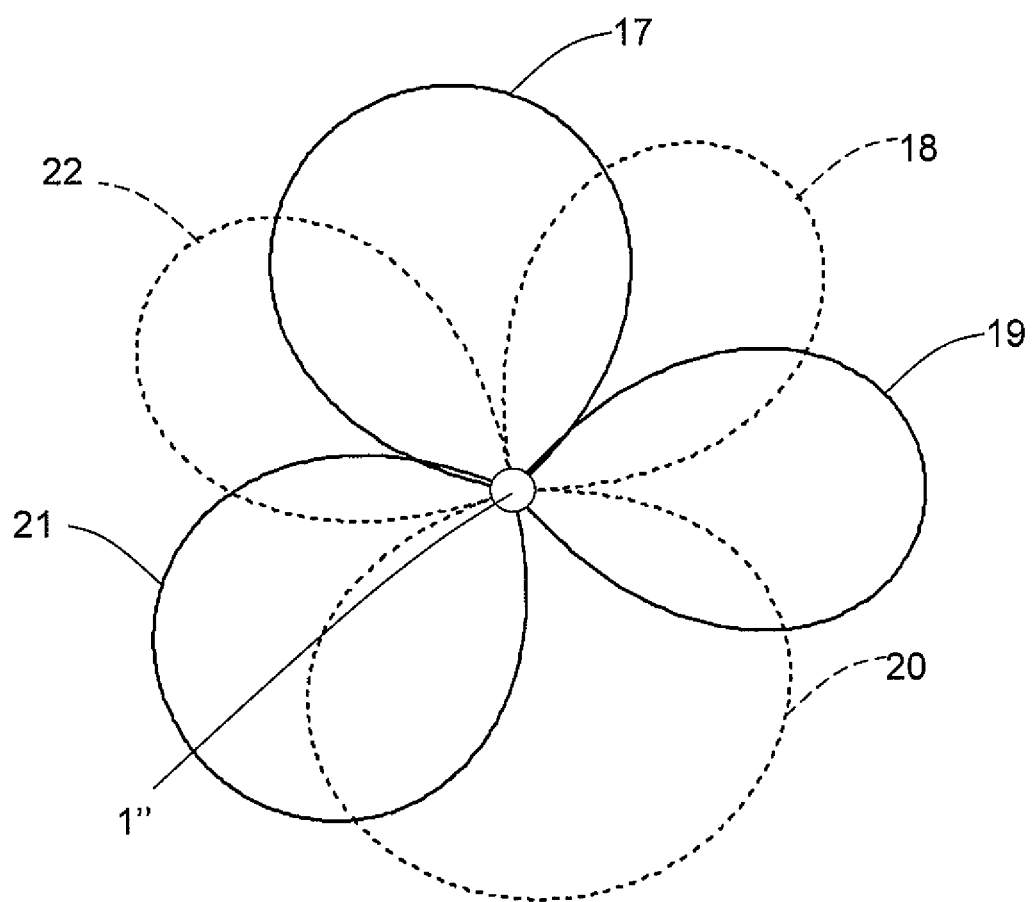
FIG. 6 schematically shows antenna radiation lobe patterns according to a third example of the present invention.

The concept can be extended to any number of antenna radiation lobes as illustrated in FIG. 6. There is a first antenna radiation lobe 17 using a first frequency band f1, a second antenna radiation lobe 18 using a second frequency band f2, a third antenna radiation lobe 19 using a third frequency band f3, a fourth antenna radiation lobe 20 using a fourth frequency band f4, a fifth antenna radiation lobe 21 using a fifth frequency band f5 and a sixth antenna radiation lobe 22 using a sixth frequency band f6. The frequency bands are preferably separated from each other.

Alternatively, the frequency bands that are separated spatially can be reused since they do not generate interference, e.g. a first set f1, f3, f5 could be the same frequency band and a second set f2, f4, f6 could be another frequency band. This is the case for all embodiment examples.

Figure 7:
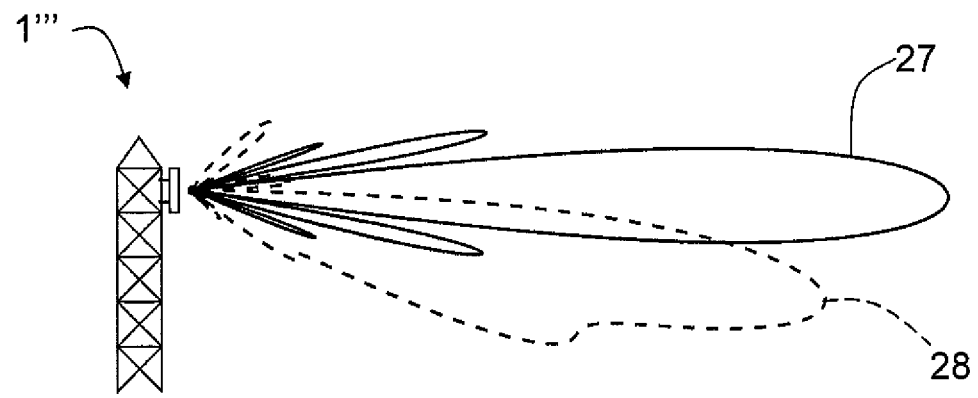
FIG. 7 schematically shows a side view of a node in a wireless communication network with antenna radiation lobe patterns according to a fourth example of the present invention.

With reference to FIG. 7, there is a node 1''' having a first antenna radiation lobe 27 using a first frequency band f1 and a second antenna radiation lobe 28 using both the first frequency band f1 a second frequency band f2, which antenna radiation lobes 27, 28 are intended for communication in a certain cell region. The first antenna radiation lobe 27 is intended for communication in the whole cell region while the second antenna radiation lobe 28 is intended for communication in a part of the cell region that is closest to the node 1'''. Here, the first antenna radiation lobe 27 constitutes an upper antenna radiation lobe and the second antenna radiation lobe 28 constitutes a lower antenna radiation lobe.

With reference also to FIG. 1, at a neighboring node 23, corresponding antenna radiation lobes are used, but with shifted frequencies, such that only radiation lobes using different frequency bands are intended for communication along and near cell borders 24, 25 between different nodes 1''', 23.

In this example, the antenna radiation lobes 27, 28 are shifted in the elevation dimension, where the first frequency band f2 is intended for communication in the whole sector while the first frequency band f1 and the second frequency band f2 only are intended for communication at the parts that are closest to the node 1''', thus reducing interference along and near cell borders 24, 25 to a neighboring node 23.

Figure 8:
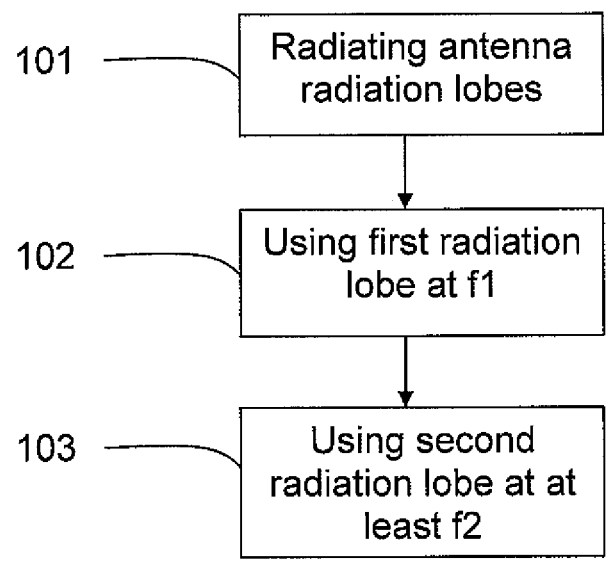
FIG. 8 shows a flowchart of for a method according to the present invention.

With reference to FIG. 8, the present invention also relates to a method for obtaining an improved interference situation along and near cell borders 11, 12; 24, 25 for a cell region 3a, 3b, 3c in a wireless communication system 2, the method comprising the steps:

101: radiating a first antenna radiation lobe 5a and a second antenna radiation lobe 7a, which antenna radiation lobes 5a, 7a are used to cover said cell region 3a, 3b, 3c at the same time, where the cell regions 3a, 3b, 3c are delimited by cell borders 11, 12 and where only one of the antenna radiation lobes 5a, 7a is intended for communication along and near each cell border 11, 12;

102: using the first antenna radiation lobe 5a for signals at a first frequency band f1, and 103: using the second antenna radiation lobe 7a for signals at at least a second frequency band f2, where, for each cell region 3a, 3b, 3c, only one antenna radiation lobe is intended for communication at each cell border 11, 12, 13; 24, 25 such that an improved interference situation at least along each cell border 11, 12, 13; 24, 25 is obtained.

The present invention is not limited to the examples above, but may vary freely within the scope of the appended claims. The described antenna radiation lobe arrangements are only examples. Other configurations can be envisioned creating frequency selective channels dependent on combinations of azimuth and elevation angle from site with different degree of overlap.

The arrangement according to FIG. 7 can be extended to completely separate frequency bands. With reference to the arrangement according to FIG. 7, a first frequency band f1 is used in the upper antenna radiation lobe and a second frequency band f2 is used in the lower antenna radiation lobe close to the base station as shown in FIG. 7. The interference within the second frequency band f2 is thus reduced in the neighboring cell. The antenna radiation lobe selection could be based on the location of a user terminal within the cell in relation to the node. A user terminal that is further away from the base station is assigned to the frequency band in the upper antenna radiation lobe, while a second user closer to the radio base station is assigned to the frequency band in the lower antenna radiation lobe.

The antenna radiation lobes do not have to be fixed in direction or shape. The antenna radiation lobe direction as well as antenna radiation lobe-width/antenna radiation lobe-shape could be changed dynamically, for example to adapt to variations in the traffic intensity such that the antenna radiation lobes completely overlap during low traffic hours, providing full system bandwidth and maximum bit-rate to all users, and only partly overlap during peak traffic hours, providing a fraction of system bandwidth to cell border region users in such a way as to maximize the bit-rates in a high-interference scenario.

The concept is applicable to spatial and polarization diversity as well as SISO (Single In Single Out), SIMO (Single In Multiple Out), and MIMO (Multiple In Multiple Out) transmissions.

The frequency bands f1, f2 could be part of an allocated TDD spectrum or a paired FDD-spectrum for an operator or they can be completely separated into different parts of the frequency spectrum, e.g. low and high frequencies. The basic concept of the invention, allocating parts of the frequency resource to different non-overlapping antenna radiation lobes, in combination with systems based on standards employing frequency-selective scheduling, such as LTE, provides antenna radiation lobe-based (variable) fractional reuse with no impact on the mobile terminal requirements.

The interference variation with frequency is increased enabling increased gain from frequency selective scheduling.

The present invention is efficient for use in a limited frequency spectrum system by dynamically scheduling the frequency band/sub-band and/or antenna radiation lobe with the highest quality for each user at each time, such as in systems utilizing OFDM. In addition, there is no need for new physical cell site deployment.

The user terminals on the market today do not have to be replaced, but can still be used with the present invention. A mobile terminal reports which frequencies that are acceptable and ignores the rest, similar to an implementation mitigating frequency selective fading.

A mobile terminal within a region straddling a sector/cell border will experience an interference situation similar to that of a mobile terminal far away from a sector/cell border, since a given set of frequencies will only be available in said region via a reduced set of radiation patterns. In the case of using the azimuth dimension for interference mitigation, adjustable azimuthal antenna radiation lobe-width and pointing direction for the base station antenna radiation pattern may be employed for maximizing system performance. This can be used for tuning antenna parameters such that a desired bandwidth and interference relationship is achieved.

The frequency bands f1, f2, f3, f4, f5, f6 used may either be separated from each other or partly overlapping. The number of different frequency bands is chosen in accordance with the situation at hand.

The number of cells may vary, the basic concept of the present invention being directed towards reducing interference from adjacent cells, either belonging to the same node or adjacent nodes, along or near cell region borders.

Each node according to the present invention comprises at least a first antenna function with a first antenna radiation lobe and a second antenna function with a second antenna radiation lobe.

The present invention relates to obtaining an improved interference situation along and near each cell border, where the term "near" refers to the area within at least one cell border region. In its most general form, the present invention relates to obtaining an improved interference situation at least along each cell border.

For each cell region, only one of the antenna radiation lobes is intended for communication in each cell border region, including along each cell border.

In general, the antenna radiation lobes have certain properties in certain planes, where these planes as indicated in the description normally are constituted by an azimuth plane or an elevation plane, where the azimuth plane extends around the node 1, 1', 1'', covering each of the node's cell regions 3a, 3b, 3c; 3a', 3b', 3c', and the elevation plane is perpendicular to said azimuth plane.

The lobe-width of an antenna radiation lobe is normally defined as half-power lobe-width, or 3 dB lobe-width.

Antenna radiation lobes on different sides of a cell border are primarily intended for communication in their respective cell regions, including the corresponding cell border regions.

The invention claimed is:

1. A node in a wireless communication system including at least a first cell region and a second cell region, where cell borders delimit between different cell regions, the node comprising:
   a first antenna radiation lobe with at least a first antenna function and a second antenna radiation lobe with a second antenna function, the first antenna radiation lobe and the second antenna radiation lobe being arranged to cover the first cell region at the same time, where, for each cell region, only one of the antenna radiation lobes communicates at each cell border,
   wherein the first antenna radiation lobe is arranged for signals at a first frequency band, and the second antenna radiation lobe is arranged for signals at least a second frequency band, where, for each cell region, only one antenna radiation lobe communicates at each cell border for improving an interference situation at least along each cell border is obtained,
   wherein at least one of a direction, width and shape of the antenna radiation lobes is dynamically changeable for obtaining a favorable frequency spectrum for communication, and
   wherein the node is configured to dynamically change the antenna radiation lobes in the first and second cell regions in accordance with an amount of traffic in the first and second cell regions such that in response to the node determining that the first and second cell regions have a low amount of traffic, the node dynamically increases an amount that the antenna radiation lobes overlap with each other to increase a bandwidth and bitrate available to users in the first and second cell regions.

2. A node according to claim 1, wherein the second antenna radiation lobe also is arranged for signals at the first frequency band.

3. A node according to claim 1, wherein for each cell region of the node, each antenna radiation lobe has a certain pointing direction in a plane, all pointing directions being mutually different.

4. A node according to claim 3, wherein the plane is an azimuth plane which extends around the node, covering each of the node's cell regions, where the antenna radiation lobes overlap in the azimuth plane.

5. A node according to claim 3, wherein the plane is an elevation plane which is perpendicular to an azimuth plane that extends around the node and covers each of the node's cell regions, where the antenna radiation lobes overlap in the elevation plane.

6. A node according to claim 5, wherein the node is intended to be arranged in a wireless communication system comprising at least a further node, said cell border being positioned between a cell region at the node and a cell region at the further node.

7. A node according to claim 1, wherein for each cell region of the node:
   each antenna radiation lobe has a certain pointing direction in a plane,
   all pointing directions being the same, and
   only one antenna radiation lobe communicates at least along the corresponding cell borders.

8. The node according to claim 1, wherein in response to the node determining that the first and second cell regions have a high amount of traffic, the node dynamically decreases an amount that the antenna radiation lobes overlap with each other to decrease a bandwidth and bitrate available to all users.

9. The node according to claim 1, wherein in response to the node determining that the first and second cell regions have a low amount of traffic, the node dynamically increases the antenna radiation lobes such that the first and second antenna radiation lobes completely overlap.

10. A method performed by a node in a wireless communication system for obtaining an improved interference situation at least along a cell border for a cell region in the wireless communication system, the method comprising:
    the node radiating a first antenna radiation lobe and a second antenna radiation lobe which antenna radiation lobes are used to cover said cell region at the same time, where the cell regions are delimited by cell borders and where only one of the antenna radiation lobes communicates in each cell border region;
    the node using the first antenna radiation lobe for signals at a first frequency band;
    the node using the second antenna radiation lobe for signals at least a second frequency band, where, for each cell region, only one antenna radiation lobe communicates at each cell border for improving an interference situation at least along each cell border region; and
    the node dynamically changing the antenna radiation lobes of the node in the first and second cell regions in accordance with an amount of traffic in the first and second cell regions such that in response to the node determining that the first and second cell regions have a low amount of traffic, the node dynamically increases an amount that the antenna radiation lobes overlap with each other to increase a bandwidth and bitrate available to all users,
    wherein at least one of a direction, width and shape of the antenna radiation lobes is dynamically changeable for obtaining a favorable frequency spectrum for communication.

11. A method according to claim 10, wherein the second antenna radiation lobe also is used for signals at the first frequency band.

12. A method according to claim 10, wherein for each cell regions of the node, each antenna radiation lobe has a certain pointing direction in a plane, all pointing directions being mutually different.

13. A method according to claim 12, wherein the plane is an azimuth plane which extends around the node, covering each of the node's cell regions, where the antenna radiation lobes overlap in the azimuth plane.

14. A method according to claim 12, wherein the plane is an elevation plane which is perpendicular to an azimuth plane that extends around the node and covers each of the node's cell regions, where the antenna radiation lobes overlap in an elevation plane.

15. A method according to claim 14, wherein the node is intended to be arranged in a wireless communication system using at least a further node, said cell borders being positioned between a cell region at the node and a cell region at the further node.

16. A method according to claim 10, wherein for each cell regions of the node:

each antenna radiation lobe has a certain pointing direction in a plane,
all pointing directions being the same,
only one antenna radiation lobe communicates at least along the corresponding cell borders.

17. The method of claim 10, wherein the first frequency band and the second frequency band are selected without any need for quality measures.

18. The method of claim 10, wherein the dynamically changeable antenna radiation lobes are adapted to completely overlap during low traffic hours and providing full system bandwidth and maximum bit-rate to all users.

19. The method of claim 10, wherein the dynamically changeable antenna radiation lobes are adapted to partly overlap during peak traffic hours and providing a fraction of system bandwidth to cell border region users.

20. The method of claim 10, wherein the improved interference situation at least along the cell border for a cell region is used in at least one of Single In Single Out (SISO) and Multiple In Multiple Out (MIMO) transmissions.

* * * * *